United States Patent [19]

Wittrisch

[11] Patent Number: 5,259,452
[45] Date of Patent: Nov. 9, 1993

[54] SYSTEM FOR SENSING ACOUSTIC WAVES IN WELLS, ALLOWING THE MECHANICAL UNCOUPLING OF THE SENSORS

[75] Inventor: Christian Wittrisch, Rueil-Malmaison, France

[73] Assignee: Institut Francais du Petrole, Rueil-Malmaison, France

[21] Appl. No.: 933,905

[22] Filed: Aug. 27, 1992

Related U.S. Application Data

[63] Continuation of Ser. No. 699,494, May 14, 1991, abandoned.

[30] Foreign Application Priority Data

May 14, 1990 [FR] France .............................. 90 06092

[51] Int. Cl.$^5$ ............................................. E21B 47/00
[52] U.S. Cl. ................................... 166/250; 166/65.1
[58] Field of Search ............... 166/250, 65.1; 181/102, 181/104; 175/40, 50; 367/25, 34, 911

[56] References Cited

U.S. PATENT DOCUMENTS

| | | | |
|---|---|---|---|
| 3,876,971 | 4/1975 | Wuenschel | 181/102 |
| 4,578,785 | 3/1986 | Gelfand | 367/911 |
| 4,690,214 | 9/1987 | Wittrisch | 166/250 |
| 4,901,289 | 2/1990 | Cretin et al. | 367/34 |
| 4,953,136 | 8/1990 | Kameta et al. | 367/25 |
| 4,987,969 | 1/1991 | Boyle et al. | 181/102 |

FOREIGN PATENT DOCUMENTS

2079559 11/1971 France .
2564599 7/1987 France .
2199585 7/1988 France .

*Primary Examiner*—Ian J. Lobo
*Attorney, Agent, or Firm*—Antonelli, Terry, Stout & Kraus

[57] ABSTRACT

The system comprises at least one sonde or probe (1) taken down into a well (2) at the end of an electric-carrying cable (3). The sonde consists of two parts (4, 5) that can be displaced in relation to one another. A first part (4), relatively light, contains most of the sensing means (geophones, accelerometers, etc). The second part (5), much heavier, contains a hydraulic anchoring system (10-11) and an electronic system (14) for the control, the acquisition of signals and the control of communications with a surface installation. An anchoring arm (9), magnetic coupling means ((7A-7C) (in case of use in a cased well) and angular positioning means (21, 22) allow to align the two parts of the sonde in relation to one another. The connection of both parts is designed in such a way that, during the measuring operations, the first part (4) containing the sensors is mechanically uncoupled from the other part (5) which is heavier.

14 Claims, 3 Drawing Sheets

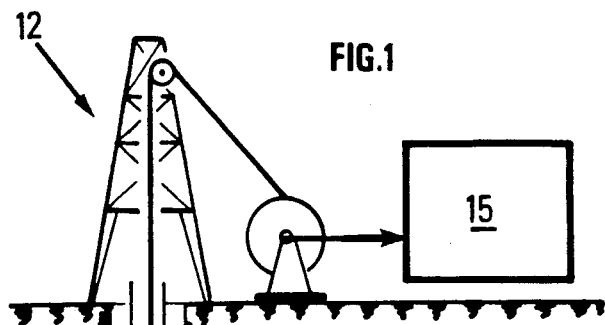
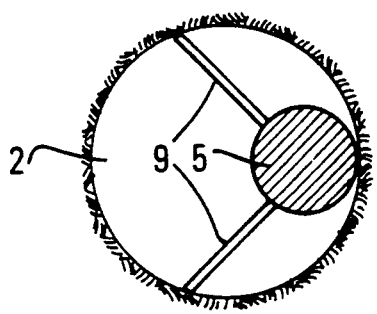
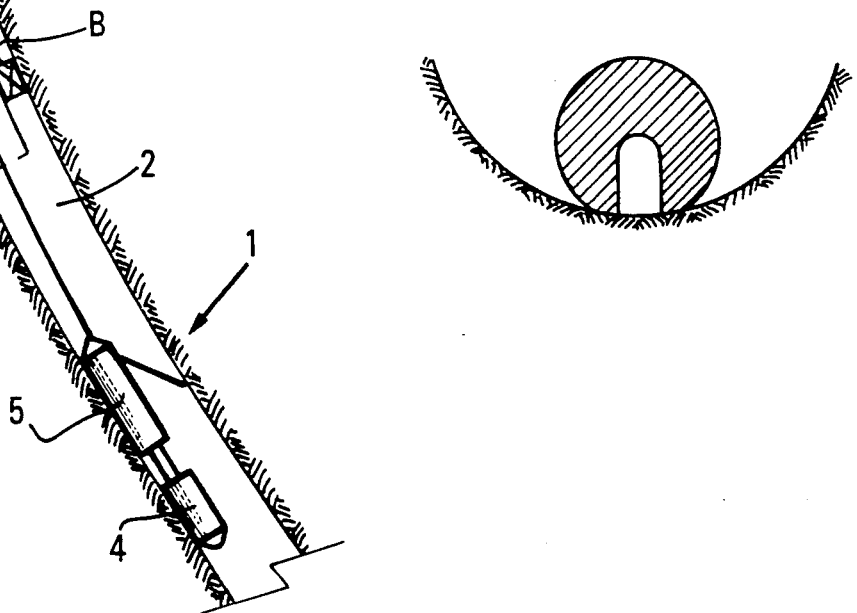

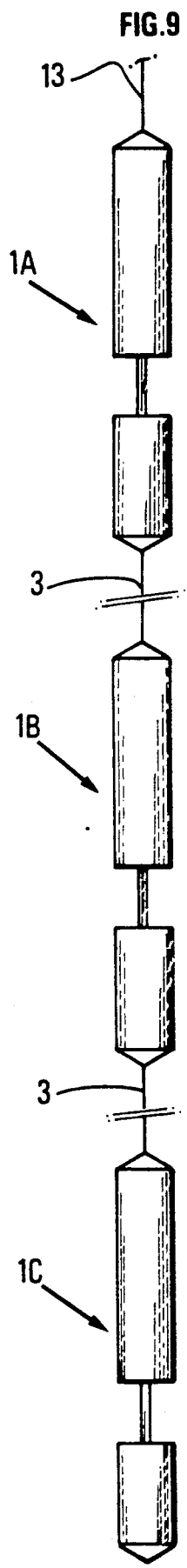
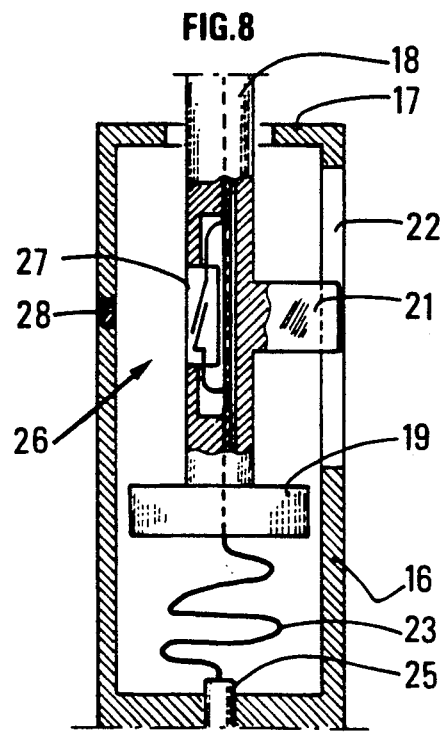
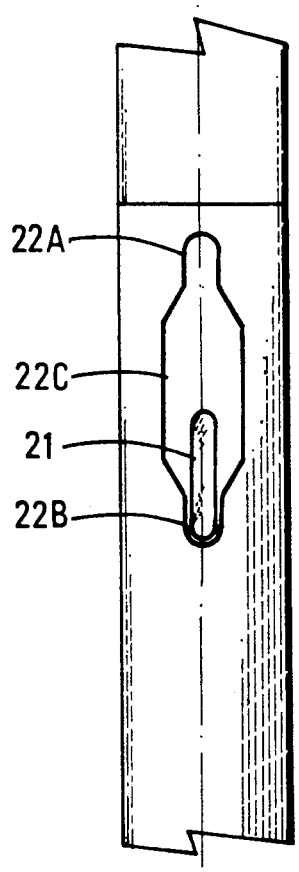
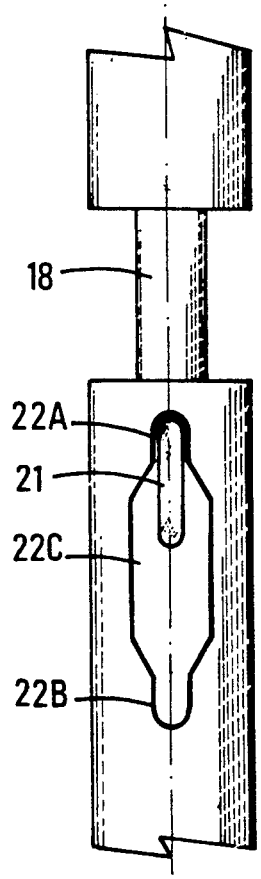
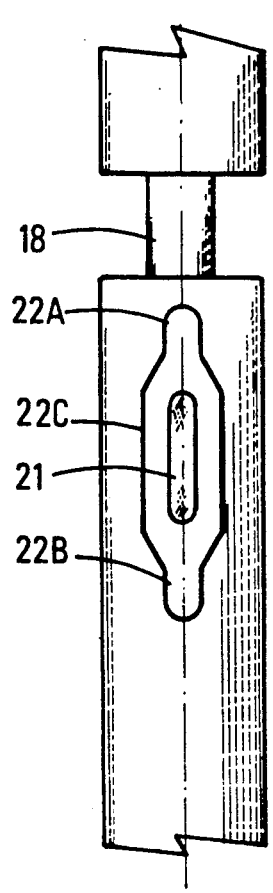

SYSTEM FOR SENSING ACOUSTIC WAVES IN WELLS, ALLOWING THE MECHANICAL UNCOUPLING OF THE SENSORS

This application is a continuation application of application Ser. No. 699,494, filed May 14, 1991, now abandoned.

BACKGROUND OF THE INVENTION

The present invention relates to a signal sensing system for production wells and notably for wells producing petroleum effluents, which allows the mechanical uncoupling of the sensors. The reception system according to the invention is particularly suitable for carrying out measurings in wells where progressing is difficult either because of the more or less strong inclination of the well in relation to the vertical, or because of its narrowness.

Such a signal sensing system has numerous applications. It can be used to detect the vibrations generated on the audio frequency band by the rocks in geologic formations when they are subjected to hydraulic fracturings, during the pumping periods which follow these fracturings or during a long pumping period in injection or else during the production period of a well. This sonde can be utilized for seismic prospecting operations implying the positioning of sensors in one or several wells. Such a signal sensing system may also have other applications such as in the monitoring of formations, of structures or of storage cavities, etc. or else for detecting seismic activities or earthquakes. More generally, the reception system which is the object of the invention can be used in all concerned activities where acoustic signals are to be picked up in a frequency band up to several thousand Hertz.

A well equipped for producing petroleum generally comprises casing, which is taken down into a borehole and immovably attached to the walls by injecting cement into the annular space between it and the well. In the production zone of the well, the casing is fitted with lateral perforations communicating with the formations surrounding the well. A flow tubing string with a section generally much smaller than that of the casing is taken down into the latter. A sealing device is arranged at the base of the string and closes the annular space between it and the casing.

Carrying out measurings in the production zone can be done by means of a standard tool with a relatively large section providing that the tubing string is first taken up, but this solution is often dismissed because of the difficulties and the delays it causes.

The subterranean production zone is generally reached by taking down into the equipped well a sonde or a tool with a section sufficiently small to pass within the flow string and go through the section restrictions due to various sealing devices (tubing packers or pump seats for example). Sondes implementing this solution are described for example in the following patents: U.S. Pat. Nos. 4,744,416, 4,737,636 4,737,636 or 4,724,385.

The progression of sondes with a relatively small section in the production zones presents no particular difficulty when the wells are substantially vertical and/or clear. It is thus conceivable to use light sondes which are less likely to have an effect on the frequency response of the measuring sensors which are included within. Another difficulty still remains which is linked to the permanent connection between the sonde and the electric-carrying cable. The latter, because of its great length, is subjected to pendular movements or acts as a transmittor of extraneous vibrations. The response of the sensors is distorted thereby and the signal to noise ratio is damaged.

French patent 2,564,599 assigned to the same assignee describes a measuring sonde whith sensors are arranged in a light basket hanging under a main unit comprising a hydraulic anchoring system by means of a supple connection and having thereby a mechanical uncoupling favouring the good reception of the signals to be picked up.

Using the sondes mentioned above, be it light sondes or a sonde with a suspended basket, is still sometimes impossible. This is the case when measurings are to be performed in zones where the progression is hindered either because the well is partly obstructed or because the sonde progresses in well portions that are more or less inclined in relation to the vertical. The sonde has to be loaded with added masses in order to overcome the increased frictional forces. This solution nevertheless has many drawbacks. The sensors arranged within the tool or sonde : geophones, accelerometers and/or possibly hydrophones, are actually mechanically coupled with a heavier tool body, which has the effect of damaging the signal to noise ratio of the signals they pick up.

SUMMARY OF THE INVENTION

The sensing system according to the invention is adapted for being taken down into a well with a small section, and particularly into a well where progression is hindered, without having the drawbacks mentioned above.

The sensing system according to the invention comprises at least one sonde connected with a surface installation by a multi-conductors electric-carrying cable and fitted with a sonde body with a small section, anchoring means comprising at least one anchoring arm associated with motor means, for applying a determined application zone of the sonde body against the wall of the well, and sensor means. The sensing system is characterized in that each sonde body is made of two parts, a first part containing the sensor means being associated with autonomous coupling means allowing to couple this first part with the wall of the well, and a second part linked to the electric-carrying cable and comprising said anchoring arm and the motor means, this second part being displaceable in relation to the first one between a coupling position where the two parts are interdependent in translation and an uncoupling position where the two parts are mechanically uncoupled in relation to one another, each sonde also comprising means for detecting the uncoupling position of the two parts of the body.

Because of the mechanical uncoupling between the two parts of the sonde and the relatively low weight of the first part which mainly contains measuring sensors, an excellent frequency response is obtained, the frequency band picked up ranging from several Hertz to 5,000 Hertz.

The coupling means for coupling the first part to the wall of the well can be all arranged on one side of the latter, in order to operate this first part substantially in alignment with the second part.

When the well is equipped with a casing, the coupling means are for example magnetic means.

The anchoring means of the second part of the body may also comprise magnetic means.

The second part of the sonde comprises for example an electronic system for the acquisition of the signals received by the sensor means of the first part and for their transmission, linking means to link the electronic system with the sensors, and means for connecting the acquisition means to conductors of the electric-carrying cable.

The linking means may consist of supple conducting wires bringing the two parts of the sonde body together.

The sensor means arranged in the first part of each sonde comprise for example geophones and/or accelerometers. The picking up means may be directional and their axes directed along one or several detection directions.

The sensor means may comprise triaxial geophones and/or accelerometers.

The means for bringing together the two parts of the body of each sonde may comprise a sleeve tightly attached to the first part, a rod fitted with a head tightly attached to the second part and displaceable in the sleeve between coupling positions while in contact with the latter and uncoupling positions without contacting it.

The means for the angular positioning of the two parts of the sonde in relation to one another may comprises a part that is salient in relation to the rod and an opening in the lateral wall of the sleeve to receive the salient part, the shape of the opening being selected in order to make the two parts of the sonde interdependent in rotation when in a coupling position in relation to one another.

The means for detecting the uncoupling positions comprise for example a switch fastened to the rod and magnetic means displaceable with the sleeve to operate the switch.

Each sonde can be fitted with a wall forming a piston for applying a propelling force by means of a fluid current.

BRIEF DESCRIPTION OF THE DRAWINGS

Other features and advantages of the sensing system according to the invention will be clear from reading the description hereafter of the embodiment procedures described by way of non limitative examples, with reference to the accompanying drawings in which :

FIG. 1 diagrammatically shows the sensing sonde taken down into an equipped well;

FIG. 3 shows a preferred arrangement of the anchoring means of the second part of the sonde;

FIG. 4 shows a cross-section of the shape of the magnets arranged in the two parts of the sonde in order to lean them against a metallic pipe, in case of a well cased with such a pipe;

FIG. 5 is a partial section of the sonde showing the layout of the first and of the second part in a coupling position one against the other during the phases where they are taken down into the well, held in an angular position in relation to one another by an adjustment key;

FIG. 6 is a similar view showing the positioning of the two parts of the sonde during the taking up phases;

FIG. 7 is a similar view in an intermediate position where the two parts are mechanically uncoupled in relation to one another;

FIG. 8 shows an embodiment example of the means for detecting the mechanical uncoupling of the two parts of the sonde, and FIG. 9 shows a well measuring system fitted with several sondes.

DESCRIPTION OF THE PREFERRED EMBODIMENTS

Figure 2:
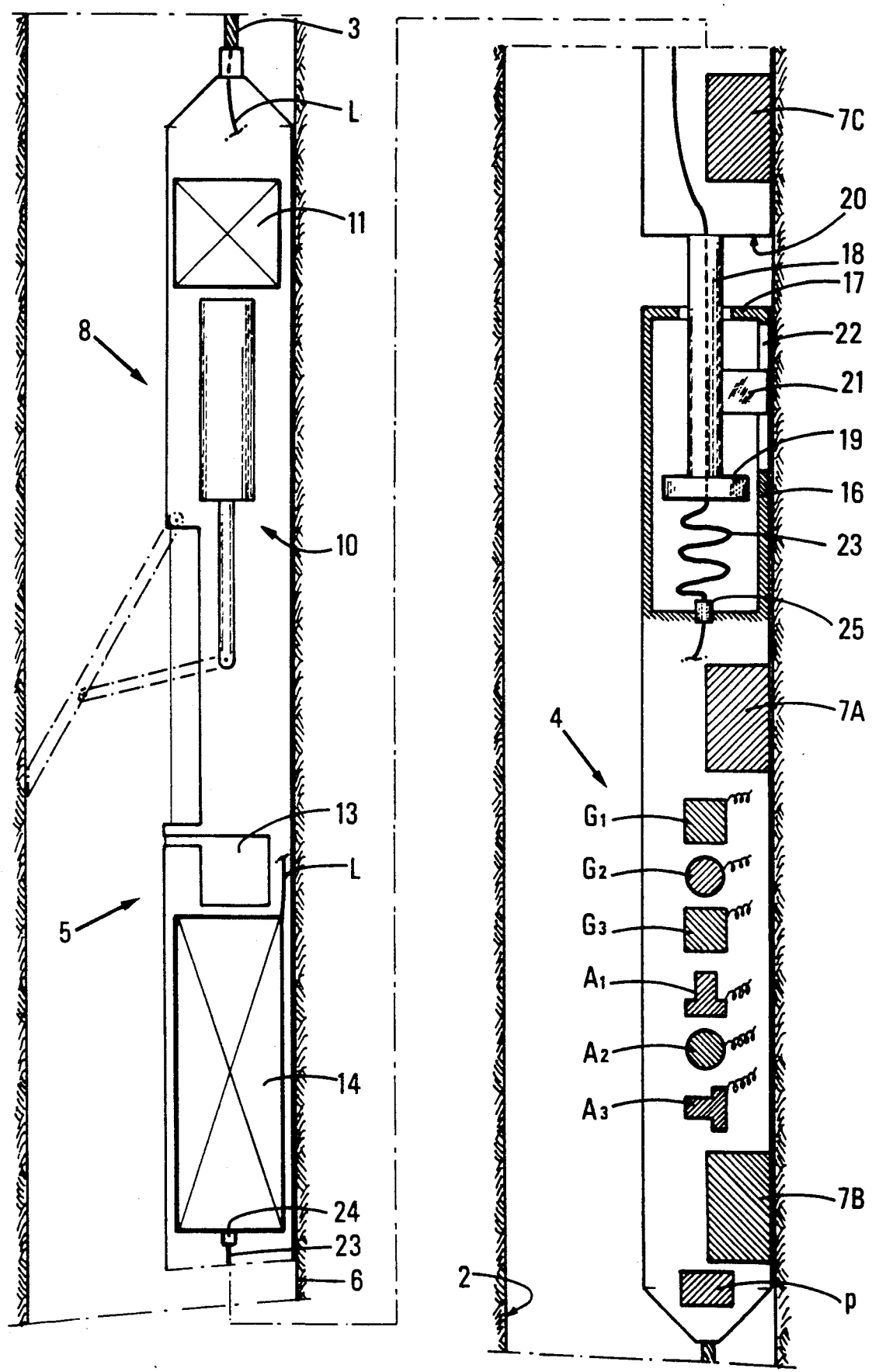
FIG. 2 diagrammatically shows the sensing sonde.

The sensing sonde 1 shown on the figures is taken down into a well 2 at the end of an electric-carrying cable 3. The sonde 1 comprises a body made of two parts 4,5 displaceable in relation to each other. The well may be equipped with a relatively narrow flow string C held in position by sealing means B.

The first part 4 comprises lodgings for picking up means that are to be uncoupled in order to prevent their response from being modified by their mechanical coupling and the part 5 of the body associated with the electric-carrying cable 3. These picking up means comprise for example at least one geophone G and/or at least one accelerometer A. For certain applications, three directional geophones G1, G2, G3 whose axes are respectively oriented following three orthogonal directions or one triaxial geophone are arranged in the first part 4 (FIG. 2). Three accelerometers A1, A2, A3 whose axes are also respectively oriented following three orthogonal directions are for example added to them. The first part 4 may also comprise a lodging for a pendulum P giving at any time the value of the angle of inclination in relation to the vertical.

Coupling means are associated to the first part 4 in order to couple it with the well. In the frequent case where the sonde is taken down into a well fitted with a metallic casing pipe 6, magnetic coupling means are for example used. These magnetic means comprise for example two magnets 7A, 7B fastened on the same side of the first part 4 and preferably aligned following the same generating line. Horseshoe magnets are preferably used (FIG. 4) and positioned in such a way that the magnetic field lines close through casing pipe 6. Permanent magnets made of alloys that are little sensitive to demagnetization such as samarium-cobalt alloys are used for example. It is also possible to utilize permanent magnets that can be neutralized on demand by displacing an air gap part so that the lines of force no longer close through the wall of pipe 6. This type of permanent magnets of a well-known type has the advantage of allowing to be switched by means of weak currents.

Magnets whose retaining force against the wall of the well is about 5 to 10 times as high as the gravitational force of the first part 4 of the sonde are selected.

The second part 5 of the body comprises an anchoring system 8 allowing to immobilize it on demand in the well. This system comprises at least one moving arm 9 which can pivot in relation to the body between a close position and a distant position where it leans against the wall. The pivoting of arm 9 can be controlled by operating a jack 10. A hydraulic control set 11 of a well-known type delivers a fluid under pressure in order to operate arm 9. It is for example possible to utilize the hydraulic control set described in French patent 2,501,380 in the name of the applicant, which is driven by an electric motor (not shown) supplied from a surface installation 12 (FIG. 1) through conducting wires of the electric carrying cable 3.

Two anchoring arms 9 are preferably used following the symmetric layout shown in FIG. 2, in order to stabilize and orientate the sonde better into the anchoring position.

The second part also comprises a compartment 13 communicating with the well, in which other sensors such as a hydrophone and/or a temperature sonde and/or a manometer (not shown) are arranged.

Towards its end that is closest to the first part, the second part also comprises a tight compartment in which an electronic system 14 of a well-known type providing the functions of control, of signal acquisition and of monitoring of the transmissions with a surface central laboratory 15 (FIG. 1) is arranged. The electronic system for well sondes described in French patents 2,613,496 (U.S. Pat. No. 4,862,425) and 2,616,230 (U.S. Pat. No. 4,901,289) assigned to the same assigne can for example be used. A multi-conductor cable L connects it to electric-carrying cable 3.

When used in a cased well, the second part 5 preferably comprises magnetic coupling means 7C analogous to magnets 7A, 7B and arranged on the side of said part which comes into contact with the wall of the well when the anchoring arm(s) 9 is (are) open.

A cylindrical sleeve 16 ending in a section restriction 17 is fastened to one end of the first part 4 of the body. A rod 18 fitted with a bulging head 19 axially extends the second part 5 of the body. The section of head 19 is smaller than the inner section of sleeve 16 but larger than that of restriction 17, and that of rod 18 is smaller than that of restriction 17. Besides, the length of rod 18 and of its head 19 is smaller than the inner depth of sleeve 16. The two parts 4,5 can be displaced in relation to one another between a close position where the end wall 20 rests upon restriction 17 and a distant position where head 19 is held back by restriction 17. The sections of the nested parts are selected in such a way that, in intermediate positions between the two extreme positions defined above, the two parts of the sonde do not touch one another when they are substantially aligned.

Sonde 1 preferably comprises angular positioning means for maintaining the angular positioning of the two parts in relation to one another. These angular positioning means comprise for example an extended key 21 radially fastened to rod 18 and having a radial dimension that is sufficient to engage into an extended port 22 (FIG. 5 to 7) made in the cylindrical sleeve following a generating line. As can be seen from FIG. 5 to 7, the width of this port 22 substantially corresponds to that of key 21 towards its two ends 22A, 22B, and it is wider in its intermediate part 22C. In the extreme close and distant positions of the two parts 4, 5, key 21 is automatically centered in relation to port 22, whereas in the intermediate position, there is no contacting between them.

The conducting wires associated with the sensor means are for example connected to one or several multiconductors transmission cables 23 passing through the space between the bottom of sleeve 16 and head 19, and joining the electronic system through an axial channel along rod 18. The electric insulation of the compartments containing the sensors in part 4 and the electronic system in part 5 is provided by tight crossings 24, 25. The portion of the multi-condutors cable between head 19 and the bottom of sleeve 16 is sufficiently loose to avoid any mechanical coupling between the two parts 4, 5 of sonde 1 therethrough. A possible residual coupling is all the more limited since permanent magnets or magnets which can be released by weak currents have been selected for coupling the lower part 4 of the sonde, which allows to utilize only conductors with a low section and therefore very supple.

The sonde also comprises means 26 for detecting the intermediate mechanical uncoupling position of the two parts 4, 5 of the sonde. These means may consist of a supple blade switch 27 (FIG. 8) cooperating with a magnet 28. Switch 27 is for example arranged along rod 18 (FIG. 8). The magnet which can close it is for example fastened to the wall of the sleeve. The location of magnet 28 in relation to switch 27 is selected in such a way that the closing of the switch only happens in the intermediate position of the two parts 4,5 of the sonde where no mechanical contact remains.

The mass of the first part 4 which only contains the sensor means and the coupling magnets 7A, 7B is generally much lower than that of the upper second part 5. In all cases, the weight of the upper part 5 is calculated in such a way that it is higher than the friction forces and/or possibly the permanent magnetic forces leaning the lower first part 4 against the well casing 6. If the weight turns out to be insufficient in view of the encountered retaining forces, additional masses (not shown) can be fastened to the electric-carrying cable above the upper part of the sonde. It is thereby possible to make the sonde progress in well portions whose inclination may reach 40 or 50° in relation to the vertical or more.

The setting of the sonde is carried out as follows.

The sonde is first preferably taken down to the maximum intervention depth. In the substantially vertical or clear parts of the well, the first part is in a suspended o distant position in relation to the second part above (FIG. 7). If the progression of the first part of the sonde is hindered, the upper part 4 comes to rest on the end part of sleeve 16 (FIG. 5). The thrust load is even increased because of the weight and the relative rigidity of the electric-carrying cable 3. It is thereby possible to make the lower part of the sonde progress as far as into relatively inclined well portions. The angular positioning of the two parts of the sonde in relation to one another is provided by key 21 and port 22 (FIG. 5 and 7).

The sonde is thereafter taken up with successive stops in multiple measuring locations along the well. During the taking up stages, restriction 17 of sleeve 16 rests on head 19. In the same way, the angular positioning of the two parts of the sonde is maintained through the interaction of key 21 and port 22.

Once each measuring position is reached and lower part 4 is immobilized in relation to the well through its coupling means 7A, 7B, or, if need be, after they have been released, the second part 5 (or upper part) of sonde 1 is slightly taken down in order to reach the desired intermediate position without any mechanical coupling (see FIGS. 2 and 7). The surface operator locates this intermediate position by means of a control light connected with the detecting means 26 such as those shown on FIG. 8. The sensing operation can then be carried out.

According to the embodiment procedure illustrated by FIG. 9, a sensing system comprising several sondes made of two parts (1A, 1B, 1C . . . ) such as those described above can be used, these sondes being interconnected by portions of electric-carrying cable 3. In each location selected for the measurings, each one of the sondes is successively positioned, beginning with the lower one (sonde 1C, then sonde 1B, then sonde 1A in case of a system fitted with three sondes), and according to the method defined above.

Other embodiments can be envisaged without departing from the scope of the invention.

The permanent magnet 7 can possibly be replaced by an electromagnet.

If a stronger residual mechanical coupling is allowable between the two parts of the sonde, they can be connected by a linking cable with conductors having a greater section and, in this case, the permanent magnets such as 7A, 7B can be replaced by electromagnets.

The magnetic coupling means can also be replaced by mechanical means in case of uncased wells. Those mechanical means can be for example one or several anchoring arms fitted with a spring, which can be released at the end of the initial taking down stage and which hold the lower part of sonde 4 resting against the wall of the well.

In the described embodiment procedure, the progressing of the sonde occurs through the effect of gravity. It would not be overstepping the scope of the invention to combine a propulsive force obtained through a fluid current applied to an annular sealing device such as a set of cups arranged around the lower par of the sonde.

I claim:

1. A sensing system for use in a well, said system comprising at least one sonde; an electric-carrying cable for connecting said at least one sonde to a surface installation; said at least one sonde comprising a first part for housing of sensing means, said first part having an outer cross-section smaller than that of the well and being provided with a lateral application face and with autonomous coupling means for coupling said application face of the first part onto a wall of the well, and a second part permanently positioned outside said first part, said second part also having a cross section smaller than that of the well and being connected with said electric-carrying cable and provided with a lateral application face and anchoring means for anchoring said second part against the wall of the well, said anchoring means including at least one anchoring arm and motor means for moving the anchoring arm away from the second part, thereby pressing the application face of the second part against the wall of the well; and connecting means including intermittent mechanical coupling means for connecting the first and second parts, said intermittent mechanical coupling means including a first rigid coupling connecting member integral with said first part and a second rigid connecting member integral with said second part, said first rigid connecting member and said second rigid connecting member coming in abutment against each other at two coupling positions spaced apart from each other thereby enabling direct driving of said first part through displacement of said second part, and said first connecting member and said second connecting member being mechanically disengaged from each other at intermediate positions between said two coupling positions resulting in a mechanical uncoupling of the first part from the second part; and means for detecting said uncoupled intermediate positions of said first and second parts.

2. A sensing system as claimed in claim 1, wherein said anchoring arm is positioned for setting said first part substantially in alignment with said second part, when engaged with the wall of the well.

3. A sensing system as claimed in claim 1, wherein said well is equipped with a metal casing pipe, said autonomous coupling means comprising magnetic means for attaching to said casing pipe.

4. A sensing system as claimed in claim 3, wherein the means for anchoring the second part also comprise magnetic means.

5. A sensing system as claimed in claim 1 or claim 3, wherein said at least one sonde further comprising means for angularly positioning said first and second parts in relation to each other.

6. A sensing system as claimed in claim 1, further comprising an electronic system for acquiring signals received by the sensing means of said first part and for transmitting the signals to the surface installation, said electronic system being enclosed in said second part; linking means for linking the electronic system to said sensing means; and electrical connecting means for connecting the electronic system to conductors within said electric-carrying cable.

7. A sensing system as claimed in claim 6, wherein said linking means includes flexible conducting wires joining said first part and said second part of the sonde.

8. A sensing system as claimed in claim 1, wherein said mechanical coupling means comprises a sleeve attached to said first part, a rod fitted with a heat member attached to the second part and displaceable within the sleeve between said coupling positions, said rod and heat member being disengaged with respect to said sleeve in said uncoupled intermediate positions.

9. A sensing system as claimed in claim 8, further comprising means for angularly positioning said first part and said second part of the sonde in relation to each other, said angular positioning means including a key member that is fixed in relation to said rod, and an opening in a lateral wall of the sleeve for receiving the fixed key, said opening having a configuration shaped for making the first and second parts interdependent in rotation when located in said coupling positions.

10. A sensing system as claimed in claim 1, wherein the detecting means comprises a switch fastened to the rod and magnetic means displaceable with said sleeve in order to operate said switch.

11. A sensing system as claimed in claim 1, wherein the sonde is fitted with means for applying a propulsive force via a fluid current to move the sonde within the well.

12. A sensing system as claimed in claim 1, wherein the sensing means arranged in the first part of the sonde comprises at least one of geophones and accelerometers.

13. A sensing system as claimed in claim 12, wherein the sensing means are directional with their axes directed along one of several detection directions.

14. A sensing system as claimed in claim 12, wherein the sensing means comprise at least one of triaxial geophones and triaxial accelerometers.

* * * * *